Oct. 6, 1953     M. A. YAKOPATZ     2,654,442
WIRE ROPE GREASER
Filed July 5, 1947     2 Sheets-Sheet 1
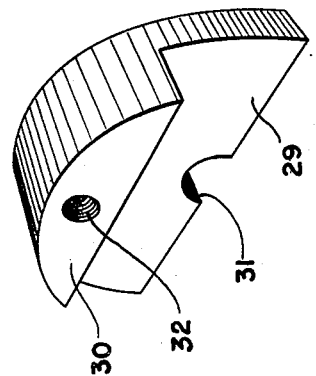
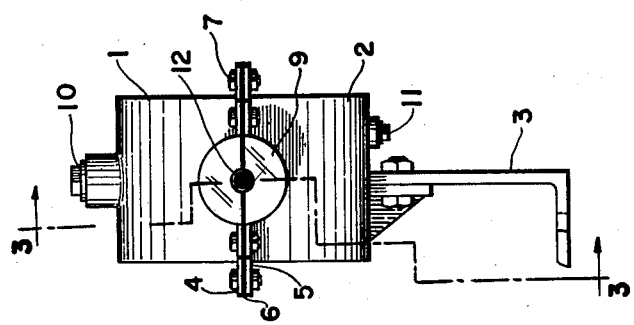
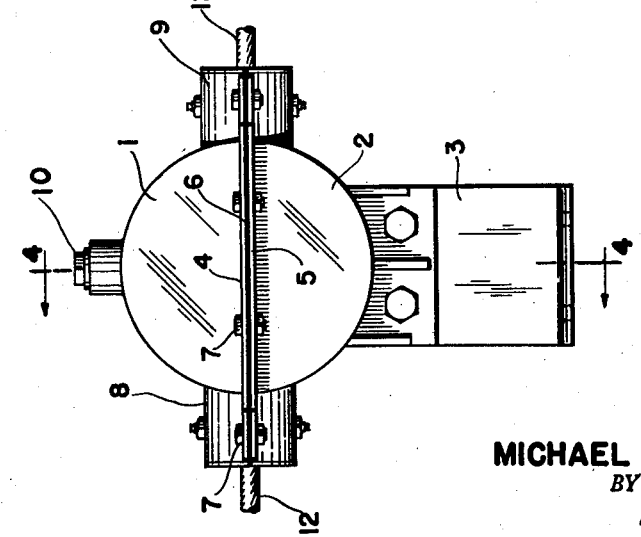
INVENTOR.
MICHAEL A. YAKOPATZ
BY *Paul Bliven*
ATTORNEY

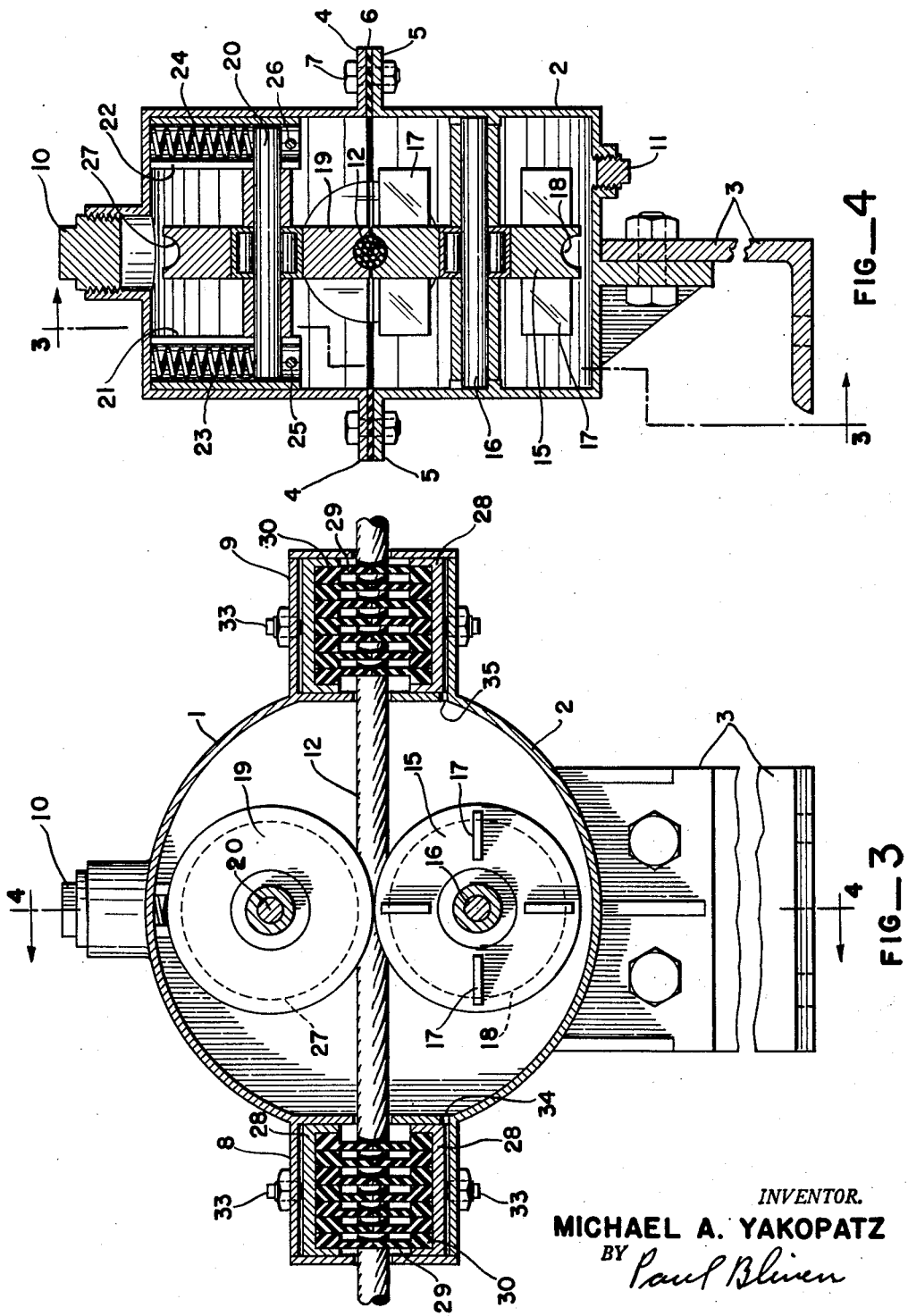

Patented Oct. 6, 1953

2,654,442

UNITED STATES PATENT OFFICE 2,654,442

WIRE-ROPE GREASER

Michael A. Yakopatz, Seattle, Wash., assignor, by mesne assignments, to Clinton L. Mathis, Seattle, Wash.

Application July 5, 1947, Serial No. 759,225

3 Claims. (Cl. 184—17)

The present invention relates to a wire-rope greaser.

In all places where wire rope is used for the transmission of power, there is a great need for a machine for applying grease to the rope. The occasional application of grease by hand with a brush or paddle is not satisfactory as it requires much labor, is intermittent, and usually so much is applied at one time that there is an excess that frees itself from the rope and comes in contact with the floor, other machinery, and persons working with the rope. What is needed is a machine that will continually apply only a small amount of grease to the rope, will distribute the grease evenly over the rope, and will work the grease into the rope so that all the grease will not be on the outer surface of the rope.

Having in mind these needs, it is an object of the present invention to devise a cable greaser that will be capable of continuous operation on a wire rope, will apply only a small amount of grease to the rope at a time, and will work the grease into the rope.

The above objects are achieved and defects remedied by means of the hereinafter disclosed device illustrated in the accompanying drawings, in which:

Figure 1 is an elevational view of a machine embodying my invention.

Figure 2 is an end view of the device shown in Figure 1.

Figure 3 is a section on the line 3—3 of Figures 2 and 4.

Figure 4 is a section on the line 4—4 of Figures 1 and 3.

Figure 5 is a perspective view of a squeegee blade used in the disclosed device.

Figure 1 is an external elevational view of a wire-rope greaser embodying my present invention. Figure 2 is an end view thereof. In these views there is shown a housing composed of a cap 1 and a bottom 2, both mounted on a base 3. The cap and bottom are both more or less in the form of a hollow half disc, and both are provided with flanges 4, 5 along their sides and adjacent their meeting faces. A gasket 6 is placed between the faces of the flanges 4, 5, and bolts 7 are passed through the flanges to secure them and the cap and bottom together into a single housing. At each end of the housing is a squeegee case 8, 9, forming an entrance for rope into and out of said housing. Each squeegee case is split into a cap and bottom, and each squeegee cap and bottom is secured to the cap and bottom of the housing, respectively. On top of the cap is a fill plug 10, and in the bottom is a drain plug 11. A portion of a wire rope 12 is shown extending through the housing and squeegee cases.

Figures 3 and 4 show the internal construction of the greaser. In the bottom 2 of the housing there is mounted a lower greasing wheel 15 that turns on or with a shaft 16 supported at its ends in bosses in the bottom 2 of the casing. This lower wheel 15 has secured to its sides a series of blades, or paddles, 17, that stir up and lift grease placed in the housing. The edge of the wheel has formed therein a groove 18. The top point of the lower wheel is even with the horizontal center plane of the housing where the cap and bottom join along their flanges. In the cap 1 of the housing there is mounted an upper greasing wheel 19. This wheel turns on or with a shaft 20 that has its ends in a slotted boss 21, 22 at each side of the cap housing. These slots allow the shaft 20 of the upper wheel to move up or down, and with it the wheel. The wheel is urged downward by gravity and a spring 23, 24 in each slot. The slot, in cross-section, may be circular with a diameter greater than the diameter of the shaft, and with the inside edge cut away from the entrance of the wheel-shaft. The spring placed in the slot has a diameter large enough to prevent its passing through the side of the slot occupied by the shaft. The shaft is held from leaving the bottom, or lower end, of each slot by means of a pin 25, 26 placed across each slot near its bottom. The top end of each slot is closed by the housing wall. The edge of the upper wheel has formed in it a groove 27 similar to the groove 18 in the lower wheel. The lowest point of the upper wheel is also on or adjacent to the horizontal plane line of the housing. The rope 12 is passed between the upper and lower greasing wheels, and the grooves in the wheels are so shaped as to conform to the rope. Movement of the rope through the housing drives the wheels, the lower wheel picking up grease and transferring such to the upper wheel and to the rope. The spring pressure of the upper wheel upon the cable squeezes the rope between the wheels and forces the grease in between the strands of the rope.

In each squeegee case 8, 9 there are arranged an upper and a lower group of squeegees. Each group is placed in a clip 28. Each squeegee blade, as shown in Figure 5, is in the general form of a semi-circular disc 29 with a spacing boss 30 along the edge away from the diameter. These blades are made of grease-impervious rubber so that they will stand up under the service to which they are subjected. The inner edge or diametrical edge of each blade is formed with a notch 31 that will closely conform to the surface of the rope. In actual practice, the height of the blades should vary from one to the next, with cooperating, or opposed, ones mating so their edges meet. This will prevent an open slot being formed along the meeting plane of the top and bottom sets of squeegees. A bolt may be passed through each blade and its boss and through the ends of the clips 28 to secure the blades in the clip. A hole 32 is formed in each boss and blade for this purpose. A set screw 33 passes through the cap and bottom of each squeegee case, and bears against the corresponding clip so that the clips and their squeegee blades may be moved to and away from the rope to vary the squeegee pressure on the rope. The set screws 33 in cooperation with the rubber wipers set the position of the clips 28 with respect to the rope. Movement of the screws in one direction will move the clips toward each other and compress the wipers together and against the rope. Movement of the screws in another direction will release the pressure on the clips and the wipers to allow the resiliency of the wipers to move the clips apart and away from the rope. The bottom portion of each squeegee case has formed therein a drain hole 34, 35 that communicates with the bottom of the casing. This allows the grease removed by the blades to run down to the bottom of each case and then into the sump in the housing. As may be seen from Figure 3, the clips 29 are spaced from the case 8 adjacent the oil holes 34, 35 and along the bottom of each case. It will be noted that radially of the cable the clips in section do not extend inward more than the spacing bosses 30. The case 8 is circular in cross section, and the disclosure states that the clips may be moved toward and away from the cable. Consequently, the clips are spaced from the case and oil will flow downward around the clips and thru the drain holes 34, 35.

In the operation of the rope greaser, the cap 1 is separated from the bottom 2, grease is placed in the bottom to well above the shaft 16. If the rope is being greased for the first time, grease may also be placed in the cap 1 before it is placed on the bottom, or grease may be inserted through the fill plug 10 after assembly of the cap and bottom. After placing the grease in the bottom, the rope 12 is laid through the housing to lie in the groove 18 of the lower wheel 15, and in the grooves 31 of the squeegees 29. The cap 1 is then placed on the bottom 2 and the cap and bottom bolted together. The rope will then lie between the upper and lower wheels 19 and 15 and in their grooves 27 and 18, and in the grooves 31 of the upper and lower squeegees 29 in the squeegee cases 8, 9. Movement of the rope through the housing will cause the wheels 15, 19 to turn and to bring grease up out of the bottom of the housing to the rope, the paddles 17 on the wheel 15 aiding in this. The springs 23, 24, bearing on the shaft 20 of the upper wheel 19, will press the rope between the wheels and force the grease into and between the strands of the rope 12. As the rope leaves the housing, it will be scraped free of excess grease by the squeegee blades 29, and this excess grease will return to the bottom 2 through the drain holes 34, 35.

Inspection of ropes after much service, which ropes have had the present device operating on them during service, has shown that they are thoroughly impregnated with the grease. The life of certain wire ropes subjected to severe service, have shown an increased life of four times that had with hand greasing.

Having thus described my invention, I claim:

1. A rope greaser, comprising: a housing bottom and cap having mating flanges and means for securing said flanges together, upper and lower opposed grooved grease wheels in said housing, squeegee cases having caps and bottoms secured to the housing cap and bottom, respectively, said cases forming antechambers for the entrance and exit of rope through said housing and between said wheels in the grooves thereof, a plurality of spaced apart squeegee blades in each case for removing excess grease from such a rope, and spring means forcing said wheels against such a rope; said blades being in the form of plates arranged so that an edge of each plate will contact such rope, a plurality of said blades forming a group, a group of said blades being placed in each of said top cases and bottom cases so as to be in opposition to each other.

2. A rope greaser, comprising: a housing bottom and cap, means for securing said base and cap together, upper and lower opposed grease wheels in said housing, said housing having formed therewith cases having caps and bottoms each secured to the housing cap and bottom respectively, for the entrance and exit of rope to be passed through said housing along the meeting plane of said caps and bottoms and between said wheels, and in said cases squeegee means for removing excess grease from said rope as it leaves said housing, said lower wheel adapted to carry grease from said bottom to said rope; said squeegee means comprising a series of spaced apart plates of rubber like material arranged so that an edge of each plate will contact such rope, a plurality of said plates forming a group, a group of said plates being placed in each of said top cases and bottom cases so as to be in opposition to each other.

3. A rope greaser, comprising: a housing bottom and cap, means for securing said bottom and cap together, an upper grease wheel secured in said cap, a lower grease wheel secured in said bottom, said wheels being opposed, said housing having formed therewith cases for the entrance and exit of rope to be passed through said housing and between said wheels, squeegee means in said cases for removing excess grease from such rope as it leaves said housing, portions of said squeegee means being secured in said cap and in said bottom, and said portions being separate means, said lower grease wheel adapted to carry grease from said bottom to said rope and upper wheel, and spring means forcing said wheels together and against such rope; said squeegee means comprising a series of spaced apart thin plates arranged so that the planes of such plates are transverse of such rope and an edge of each plate will contact such rope, and said plates being composed of a rubber like material.

MICHAEL A. YAKOPATZ.

References Cited in the file of this patent

UNITED STATES PATENTS

| Number | Name | Date |
|---|---|---|
| 632,655 | Lewis | Sept. 5, 1899 |
| 945,622 | Slaughter | Jan. 4, 1910 |
| 1,471,583 | Andersen | Oct. 23, 1923 |
| 1,472,555 | Crowell | Oct. 30, 1923 |
| 1,509,906 | Sawtelle | Sept. 30, 1924 |
| 1,881,555 | Heegem | Oct. 11, 1932 |
| 1,893,107 | Severson | Jan. 3, 1933 |
| 2,435,120 | Baker | Jan. 27, 1948 |

FOREIGN PATENTS

| Number | Country | Date |
|---|---|---|
| 193,950 | Great Britain | Feb. 28, 1923 |
| 714,911 | France | Sept. 14, 1931 |
| 164,640 | Germany | Nov. 4, 1905 |